United States Patent [19]

Heidemeyer et al.

[11] 4,401,200

[45] Aug. 30, 1983

[54] ARRANGEMENT FOR AUTOMATIC CLUTCH ACTUATION

[75] Inventors: Paulus Heidemeyer; Erhard Bigalke, both of Wolfsburg; Frank Zimmermann; Hartmut Werner, both of Braunschweig, all of Fed. Rep. of Germany

[73] Assignee: Volkswagenwerk Aktiengesellschaft, Wolfsburg, Fed. Rep. of Germany

[21] Appl. No.: 206,072

[22] Filed: Nov. 12, 1980

[30] Foreign Application Priority Data

Nov. 17, 1979 [DE] Fed. Rep. of Germany ....... 2946497

[51] Int. Cl.³ .............................................. B60K 41/02
[52] U.S. Cl. ............................. 192/0.076; 192/0.096; 192/103 F
[58] Field of Search ............... 192/0.033, 0.076, 0.096, 192/103 R, 103 F, 3.59, 3.57, 3.58; 74/866

[56] References Cited

U.S. PATENT DOCUMENTS

| | | | |
|---|---|---|---|
| 2,152,089 | 3/1939 | Price et al. ..................... | 192/0.076 X |
| 2,486,721 | 11/1949 | Schantz ......................... | 192/0.076 X |
| 3,752,284 | 8/1973 | Brittain et al. ................. | 192/103 F |
| 4,019,614 | 4/1977 | Prenzel et al. ................. | 192/3.58 X |
| 4,061,217 | 12/1977 | Toyota et al. .................. | 192/3.59 X |
| 4,248,333 | 2/1981 | Matsumoto et al. ......... | 192/0.033 X |
| 4,295,551 | 10/1981 | Zimmermann et al. ......... | 192/0.076 |
| 4,331,226 | 5/1982 | Heidemeyer et al. ...... | 192/103 F X |
| 4,343,387 | 8/1982 | Hofbauer ........................ | 192/0.076 |

*Primary Examiner*—Rodney H. Bonck
*Attorney, Agent, or Firm*—Brambaugh, Graves, Donohue & Raymond

[57] ABSTRACT

An arrangement for the automatic actuation of an automobile clutch operatively located between an automobile engine and a manually shiftable transmission, of the kind that includes a servo motor responsive to auxiliary power applied thereto for effecting engagement and disengagement of the clutch, and control means for controlling the auxiliary power delivery to the servo motor as a function of the position of the accelerator pedal, or the clutch input (engine output) and output (transmission input) rotational speeds, or both, and wherein the control means controls the auxiliary power delivery to the servo motor so that the rotational speed of the engine attains a prescribed rotational speed which is a function of the position of the accelerator pedal, the auxiliary power delivery being an application pulse to the servo motor of sufficient duration to almost completely overcome the free travel of the clutch.

6 Claims, 1 Drawing Figure

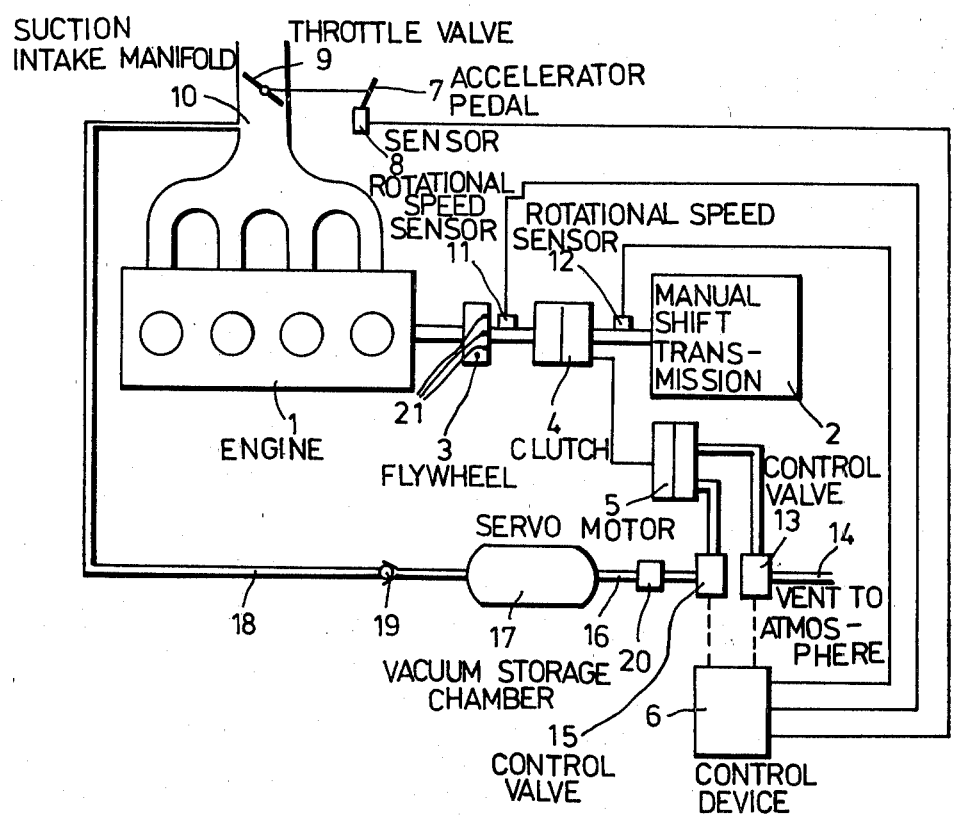

ARRANGEMENT FOR AUTOMATIC CLUTCH ACTUATION

BACKGROUND OF THE INVENTION

This invention relates to an arrangement for an automatic clutch for use in connection with a manually shifted transmission for selectively connecting the output shaft of the vehicle engine to the input shaft of the transmission.

More particularly, the invention relates to a clutch actuation arrangement having a clutch actuating servo motor operated by auxiliary power (pneumatic for example) and having a control device or means for controlling the servo motor as a function of the position of the accelerator pedal and/or the speeds measured at the input to the clutch (engine speed) and at the output of the clutch (transmission input speed).

Automatic automobile clutches have been known in the prior art and usually make use of a pneumatic servo motor. The motor is usually arranged to provide disengagement of the clutch through vacuum pressure action on the servo motor. Engagement of the clutch, on the other hand, is usually effected through venting of the servo motor and must be effected as smoothly as possible to avoid undesirable shocks and jerks in the vehicle motion as the clutch is engaged.

An arrangement providing for smooth engagement of the clutch is described in detail, for example, in the commonly owned, co-pending U.S. patent application Serial No. 165,686 filed July 3, 1980 corresponding to German patent application No. P 29 27 175.8 filed July 5, 1979, and now U.S. Pat. No. 4,331,226, comprising a pneumatic control motor which is responsive to signals received from control valves in accordance with the position of the accelerator pedal and/or the rotational speed of the engine shaft and transmission shaft measured on opposite sides of the clutch. The disclosure of that U.S. application is incorporated herein by reference. That application discloses the operation of clutch engagement where the engine is running and the vehicle is at a standstill. The starting of the vehicle is controlled so that the engine rotational speed is brought to a prescribed value by means of engagement or disengagement of the clutch, the prescribed value being variable as a function of the accelerator pedal position. Control is thereby effected step by step by a plurality of control pulses occurring at time intervals. By modifying the pulse length or pulse frequency, a control device influences the progress of clutch control. The operation of such a control device is described in detail in the commonly owned co-pending U.S. patent application Ser. No. 123,440, filed Feb. 21, 1980, and now U.S. Pat. No. 4,343,387, corresponding to German patent application No. P 29 06 587.0 filed Feb. 21, 1979. The disclosure of that U.S. application is incorporated herein by reference. There, a control pulse is varied as a function of the difference between the actual engine rotational speed and the desired engine rotational speed so that as the difference between the actual and desired rotational speed increases, the pulse increases either linearly or progressively. In other words, the more the engine speed differs from the desired speed, the more the engine speed is caused to approximate the desired speed by actuation of the clutch.

In the above-described arrangement of U.S. application Ser. No. 165,687 it is assumed that the clutch engagement process is accomplished through venting of the servo motor by connection of the servo motor to the atmosphere by one of the control valves. Conversely, the disengagement process is accomplished by connection of the servo motor with vacuum storage by the other control valve.

It is known that automobile clutches operating with friction linings, as is customary, must overcome a relatively long period of free travel of the clutch before the friction linings begin to take hold. The above-described co-pending application Ser. No. 165,687 overcomes this deficiency by effecting clutch engagement by a series of pulses succeeding each other at time intervals.

Because it is desirable, however, to overcome this period of free travel of the clutch as rapidly as possible, the present invention is an improvement over the co-pending application because it substitutes for this series of pulses, an initial pulse of sufficient duration to almost completely overcome the free travel of the clutch.

SUMMARY OF THE INVENTION

Accordingly, it is an object of the invention to improve the clutch operating apparatus of the kind in, for example, aforesaid co-pending U.S. application Ser. No. 165,687 by providing an apparatus whereby the clutch engagement is controlled to occur as rapidly as possible.

It is a further object of the invention to engage the clutch as rapidly as possible while at the same time maintaining the comfort of the vehicle occupants by avoiding undesirable shocks and jerks during the clutch engagement process.

These objects of the invention are obtained by substituting a first application pulse from the control device to the control valves, the pulse being of sufficient duration to overcome the free travel of the clutch, the pulse then terminating at or about the instant at which the friction linings of the clutch begin to take hold.

According to the invention there are three methods which may be used to determine the exact instant at which the friction linings are about to engage and, correspondingly, that the application pulse is to be terminated. In each of the embodiments, markers are affixed at defined points on the flywheel (or the crankshaft) for determining the rotational speed of the crankshaft (engine output). A sensor examines these markers individually and delivers signals which the control device, in this case a microprocessor, uses to determine one or more of the rotational speed, the tendency of the rotational speed (i.e. the change of speed) and the development of that tendency (e.g. the very first deviation from the change of speed that is to be expected prior to engagement of clutch). In a first embodiment, an indication of the initial engagement of the friction linings may then be taken to be the first rotational speed measured value outside a predetermined range of the rotational speed characteristic.

In the second embodiment several, e.g., three, successive rotational speed values are determined. The indiction that the friction linings are just beginning to engage, and therefore, that the application pulse is to be terminated, is an indication that the rotational speeds are showing an increasing deviation (e.g. tendency) from the prescribed rotational speed characteristic. In this embodiment, the individual rotational speeds need not necessarily be outside the range; it is an indication if the measured values merely show a tendency for deviating from the range.

Finally, a third embodiment utilizes a mean value. For each successive rotational speed value a mean value of a fixed number of successive rotational speed values is calculated. For example, for each shaft rotation, the time between each marker passing the sensor can be ascertained. From this the mean speed of the shaft or flywheel during a single revolution can be determined. This mean value can then be compared to a predefined mean value characteristic. In the event of a deviation from the predefined mean value, the deviation is assumed to be an indication that the friction linings are just beginning to engage and, accordingly, the application pulse is to be terminated.

The above and further advantages of the invention will better be understood with reference to the following detailed description of the invention taken in connection with the attached drawing.

BRIEF DESCRIPTION OF THE DRAWING

FIG. 1 is a schematic representation in block diagram form of a clutch system in accordance with the present invention.

DETAILED DESCRIPTION OF THE DRAWING

As shown in FIG. 1 the elements of a clutch system in accordance with the present invention are useful in a motor vehicle including a motor 1, which is connected to a transmission 2 by means of a flywheel 3 and a clutch 4, the transmission 2 being arranged to provide manual shifting between gears. The clutch mechanism is not actuated by the usual foot pedal, but is engaged and disengaged by means of a servo motor 5, which is controlled by auxiliary power. In this case the auxiliary power is pneumatic, the servo motor 5 being a pneumatic vacuum activated servo motor known in the art.

Control valves 13 and 15 operate the servo motor according to signals that are provided to the valves 13 and 15 via a control device 6. Control valves 13 and 15 alternatively connect the servo motor 5 with a line 14 to atmospheric pressure, or with a vacuum line 16 that is connected to a vacuum storage chamber 17. The vacuum storage chamber 17 is preferably connected by a vacuum line 18 with the suction intake manifold 10 of the engine 1. The connection to the intake manifold 10 is preferably arranged at a point that is after the throttle valve 9 in the direction of the intake flow. A non-return valve 19 is provided in the vacuum line 18 for preventing reverse flow in the line 18 in the event the manifold pressure increases above the pressure of the vacuum storage chamber 17.

The control device 6 responds to signals indicative of the position of the accelerator pedal 7, as sensed by a sensor 8. The control device 6 also responds to signals supplied by sensors 11 and 12, which sense the rotational speed of the engine shaft and transmission shaft on opposite sides of the clutch 4, respectively.

In one embodiment of the invention a pressure limiting valve 20 is arranged in the vacuum line 16 between the control valve 15 and the vacuum storage chamber 17. The pressure limiting valve operates to maintain a predetermined level of vacuum pressure acting on the control valve 15, and the motor 5. Assuming a vacuum pressure is thus being applied at a constant level, the pulse needed to control valve 13 thereby vent the servo motor 5, and to effect the engagement of the clutch, is capable of precise determination. The applied pulse is then controlled so as to be of sufficient duration barely to overcome the free travel of the clutch just prior to engagement.

In another embodiment of the invention other than that illustrated in the drawing, but nevertheless embodying the inventive concepts herein, the pressure limiting valve 20 may be eliminated. Accordingly, it will be understood by those skilled in the art that the servo motor 5 will be acted upon by vacuum pressure of varying levels. In order to insure that the application pulse is not too long and that the friction linings have just begun to engage and have not yet taken hold during the duration of the pulse, the said application pulse must be determined in accordance with the least possible vacuum pressure in the vacuum storage chamber 17. However, the pressure in the chamber 17 will ordinarily be at a higher level than the least possible level. Accordingly, the first application pulse in this embodiment must be followed by several control pulses at time intervals to permit the clutch engagement process to continue in a controlled manner as described in co-pending application Serial No. 165,687. It would also be possible to control the application pulse in a controlled manner if a measuring device is available to signal the initial engagement of the friction linings. However, the provision of the measuring device will obviously make the arrangement more expensive.

Such a measuring device may be formed by a system for determining the rotational speed of the crankshaft at the flywheel 3. According to the present invention there are placed on the flywheel several markers 21 at defined points that are examined individually by the rotational speed sensor, to determine the rotational speed of the crank-shaft, and the tendency of the rotational speed characteristic By the tendency of the crankshaft rotational speed characteristic, we mean the inclination of the crankshaft speed to assume a future course. For example, if at each measurement the actual speed shows an increasing difference from a preassigned desired value, it may be concluded that after a given time period had elapsed, a predefined range of desired speed is defined. This can be done for example by using the microprocessor of the control device 6 to ascertain the change in speed and the deviation of the mean speed from its prescribed value as outlined above. This provides three different indications of the initial engagement of the friction linings as follows.

A first indication of the initial friction lining engagement may be taken at the instant at which a first rotational speed measured value is outside a given range of the rotational speed characteristic. This range may be determined for each engine in advance as a function of the rotational speed of the engine, the engine load, special vehicle parameters, and also as a function of the manner of operation, the particular clutch and its associated apparatus. In microprocessor-based control devices 6 like those in the above-identified U.S. applications, this comparison is easily made by a comparison circuit that compares the measured speed at the flywheel with the stored engine speed upper and lower limits of a range of speeds for a detected set of parameters such as accelerator pedal or throttle valve position and transmission input shaft speed.

If, then, in the course of the clutch engagement process, the rotational speed deviates from this predetermined range, particularly if the rotational speed falls below said range, this may be considered as an indication that the friction linings are starting to take hold and, therefore, that the application pulse is to be terminated.

A second indication of the initial friction lining engagement may be the instant at which several, e.g., three, successive rotational speed measured values show increasing deviations from a predetermined rotational speed characteristic. In this case, the various individual rotational speeds need not necessarily deviate from a predetermined range; the various speeds need merely show a tendency toward such deviation. Once it is ascertained that the crankshaft speed is in the predetermined range as described above, comparison of successive speeds is easily accomplished in any of a large number of ways, for example, by storing a detected first speed, and then subtracting successively detected second and third speeds from the first speed to arrive at two differences, comparing the two differences to determine if the latter difference is larger, indicating an increasing deviation towards an out of range speed.

As a third indication of the initial friction lining engagement, for each new measured rotational speed value there is calculated a mean value of a fixed number of successive measured speed values. This mean value is then compared with a predefined mean value characteristic. In the event that the mean value deviates from the predetermined mean value, the deviation may be assumed to indicate that the friction linings are starting to take hold and, therefore, that the application pulse is to be terminated. Microprocessor-based circuitry in a control device 6 can accomplish this in a number of ways as well. Precalculated mean speeds are stored for various operating conditions, throttle position and the like, several successive speed measurements are made by detecting the passage of the marks 21 during a single revolution of the flywheel, for example, and a mean speed is calculated based on the measured speeds. An abrupt change in speed during a revolution will alter the calculated mean speed, and comparison of the precalculated and current mean speeds will signify the start of clutch engagement.

It should be noted that the above description relates to a preferred embodiment, and that variations may be made without departing from the spirit or scope of the disclosure. For example, the servo motor 5 could be actuated in such a manner that the control device 6 initially activates electrical pre-control valves requiring less energy to activate and having smaller control cross sections. These pre-control valves could then each activate a main control valve having a sufficient cross section, or possibly a common main control valve, which would operate with the energy-carrying servo medium, e.g., the vacuum pressure. The utilization of pre-control valves would be better suited with the electronic actuation by the control device 6 because smaller, and more economical, pulse amplifiers (transducers) with a smaller current consumption could then be used. Moreover, the servo valves would have shorter switching dead times, which may be of importance to the functioning of the clutch controls.

Additionally, the clutch could be disengaged by ventilation and engaged by evacuation in a manner opposite to that described in the disclosure. In principle, however, the operation of the control valves would not be affected by such a change.

We claim:

1. In an arrangement for the automatic actuation of an automobile clutch operatively located between an automobile engine and a manually shiftable transmission, of the kind that includes a servo motor responsive to auxiliary power applied thereto for effecting engagement and disengagement of the clutch, and control means for controlling the auxiliary power delivery to the servo motor as a function of at least one of the speed adjusting means, and the clutch input and output rotational speeds, and wherein the control means controls the auxiliary power delivery to the servo motor so that the rotational speed of the engine attains a prescribed rotational speed that is a function of accelerator pedal position; the improvement wherein said servo motor is a vacuum responsive control motor and said control means for controlling auxiliary power delivery to the said servo motor comprises means for providing a first application pulse of sufficient duration to almost completely overcome the free travel of the clutch to the instant at which the friction elements of said clutch begin to engage, the arrangement further comprising a vacuum pressure storage means and engine suction tube means connecting said storage means with the intake manifold of said engine, said servo motor being activated by vacuum pressure storage means, wherein the length of said first application pulse is selected on the basis of the smallest possible vacuum present in said vacuum storage pressure means.

2. A clutch actuation arrangement according to claim 1, further comprising a pressure limiting means arranged between the vacuum pressure storage means and the servo motor, said pressure limiting means adjusting the vacuum pressure action on the servo motor to a constant vacuum pressure level, the application pulse being determined in accordance with said vacuum pressure level.

3. In an arrangement for the automatic actuation of an automobile clutch operatively located between an automobile engine and a manually shiftable transmission, of the kind that includes a servo motor responsive to auxiliary power applied thereto for effecting engagement and disengagement of the clutch, and control means for controlling the auxiliary power delivery to the servo motor as a function of at least one of the speed adjusting means and the clutch input and output rotational speeds, and wherein the control means controls the auxiliary power delivery to the servo motor so that the rotational speed of the engine attains a prescribed rotational speed that is a function of accelerator pedal position, the improvement wherein said control means for controlling auxiliary power delivery to said servo motor includes control valves, one of which valves is associated to the atmosphere, and a control device for providing a first application pulse to said valve associated to the atmosphere, and means for determining the instant at which said friction elements begin to engage whereby said control device activates said control valve associated to the atmosphere by said application pulse until such instant, the arrangement further comprising determining means for determining the rotational speed characteristic of the engine crankshaft comprising markings affixed at defined points to the engine flywheel, means responsive to said markings for delivering signals plotted against time and measured at short time intervals, said determining means delivering a signal for termination of said application pulse upon the indication that said rotational speed characteristic is deviating from a predetermined rotational speed characteristic.

4. A clutch actuation arrangement according to claim 3, further comprising a predetermined range of rotational speeds wherein said indication of deviation is the first measured value of said rotational speed outside said predetermined range of rotational speeds.

5. A clutch actuation arrangement according to claim 3, wherein said indication of deviation is the increasing deviation of said rotational speed values from said predetermined rotational speed characteristic, said rotational speed values being measured at a defined number of successive measuring points.

6. A clutch actuation arrangement according to claim 3, wherein a predetermined mean value characteristic is provided and a rotational speed mean value is determined for each successive measured rotational speed value from a predetermined number of said measured rotational speed values, and said indication of deviation is the first deviation of said rotational speed mean value from said predetermined mean value characteristic.

* * * * *